(12) United States Patent
Mody (10) Patent No.: US 8,850,313 B2
(45) Date of Patent: Sep. 30, 2014

(54) SYSTEMS AND METHODS FOR INCREASING RELEVANCY OF SEARCH RESULTS IN INTRA WEB DOMAIN AND CROSS WEB DOMAIN SEARCH AND FILTER OPERATIONS

(75) Inventor: Mehernosh Adi Mody, Austin, TX (US)

(73) Assignee: Mehernosh Mody, Austin, TX (US)

( * ) Notice: Subject to any disclaimer, the term of this patent is extended or adjusted under 35 U.S.C. 154(b) by 0 days.

(21) Appl. No.: 13/368,412

(22) Filed: Feb. 8, 2012

(65) Prior Publication Data

US 2013/0204858 A1  Aug. 8, 2013

(51) Int. Cl.
    G06F 17/30  (2006.01)
(52) U.S. Cl.
    CPC ............... G06F 17/30867 (2013.01)
    USPC .......................... 715/513; 707/758
(58) Field of Classification Search
    CPC combination set(s) only.
    See application file for complete search history.

(56) References Cited

U.S. PATENT DOCUMENTS

| | | | |
|---|---|---|---|
| 6,408,297 B1 | 6/2002 | Ohashi | |
| 6,442,589 B1 * | 8/2002 | Takahashi et al. | 709/203 |
| 6,920,609 B1 | 7/2005 | Manbar | |
| 7,353,246 B1 * | 4/2008 | Rosen et al. | 709/202 |
| 8,209,331 B1 * | 6/2012 | Garg et al. | 707/734 |
| 2002/0103902 A1 * | 8/2002 | Nagel et al. | 709/225 |
| 2004/0254935 A1 * | 12/2004 | Chagoly et al. | 707/10 |
| 2005/0038785 A1 | 2/2005 | Agrawal | |
| 2005/0097188 A1 * | 5/2005 | Fish | 709/217 |
| 2006/0224938 A1 * | 10/2006 | Fikes et al. | 715/500 |
| 2007/0005686 A1 * | 1/2007 | Fish et al. | 709/203 |
| 2007/0288457 A1 * | 12/2007 | Aravamudan et al. | 707/5 |
| 2008/0177994 A1 * | 7/2008 | Mayer | 713/2 |
| 2009/0248661 A1 * | 10/2009 | Bilenko et al. | 707/5 |
| 2011/0040824 A1 * | 2/2011 | Harm | 709/203 |
| 2011/0302499 A1 * | 12/2011 | Chou et al. | 715/738 |
| 2013/0007124 A1 * | 1/2013 | Sweeney et al. | 709/204 |

* cited by examiner

*Primary Examiner* — Neveen Abel Jalil
*Assistant Examiner* — Karina Levitian

(57) ABSTRACT

An object of this invention is to filter the results of a website search or a published list on a website, by applying mathematical or logical criteria selected by the user or program, to any of the informational details of an element in the search result or list. An object of this invention is to expand the set of details associated with each element of the search result or published list by gathering user specified information associated with each element from the same or different websites. An object of this invention is to allow the user to identify details of interest of an element in the search result or published list and to limit the presentation of the results to the details of interest. An object of this invention is to accomplish this functionality in a generic manner independent of a specific or set of websites.

7 Claims, 7 Drawing Sheets

FIG 6: Filter Management

SYSTEMS AND METHODS FOR INCREASING RELEVANCY OF SEARCH RESULTS IN INTRA WEB DOMAIN AND CROSS WEB DOMAIN SEARCH AND FILTER OPERATIONS

SPECIFICATION AND DETAILED DESCRIPTION OF INVENTION

Internet search engines assist the user in locating websites that possess the products and/or information they seek. Websites in turn implement functionality to help the user narrow the search parameters to a manageable set of products or information. The search or filter functionality provided by websites allows the user to define search criteria on the most common details of the results. For example, many websites will allow some form of filter on price. This leaves the user to manually reduce the search to a handful of items.

By implementing a generic client-side filter solution, this invention makes possible filtering on any and all details of a result, thus significantly reducing search costs for the user. Another feature of this invention is that the user may add to the details of one of the results by gathering information about the result from secondary websites. This invention adds corresponding details from the secondary websites to other similar results.

Figure 1:
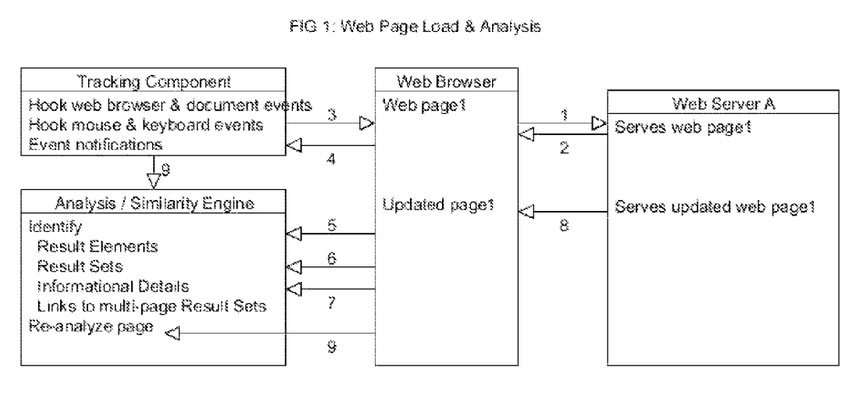
FIG. 1 illustrates the process diagram of the events and interactions during a web page load operation.

FIG. 1 illustrates the process of a web page being loaded into a browser from web server A (1), (2) by the web browser. The tracking component 'hooks' events related to browser and document activity for the purposes of detecting changes to the document being displayed (3). Events related to user interface devices are also captured to identify elements of the document the user was interfacing with as well as the nature of the interactions. The tracking component receives event notifications (4) for the 'hooked' events, for example, when the document's content changes. Once the web page is loaded the analysis/similarity engine identifies result sets consisting of result elements which consist of informational details (5).

A group of elements on a web page, having similar or identical structure, style, screen position and lineage along with a threshold quantity of similar elements of siblings and children of various real world content types such as images, text, dates, times, currency amounts, etc. as other groups of elements on the page, are deemed to be result elements, if the count of such groups exceeds a threshold number. The lineage of an element is the chain of parent elements to the root element of the web page. Informational details are all of the rendered or non-rendered elements contained in a result element. Multiple result elements constitute a result set.

An embodiment of this invention uses an algorithm that generates a histogram of elements with all the stated information for each element. This histogram is then iterated over with varying thresholds to identify result elements and their constituted result sets.

Result elements are identified based on information gather from any combination of the following;
  Structure of the document
  Style of various elements in the document
  Screen Position
  Lineage of various elements in the document
  Number and count of siblings of each element in the document
  Number and count of children of each element in the document
  Real-world data type of the text
  Form analysis of the displayed text Real-world data type detection of text is accomplished by using predefined regular expressions for widely used formats of real-world data. For example using a regular expression to detect and locate time values such as "12:30 pm", in the reference of comparison text.

Form analysis of the displayed text is performed by parsing individual characters into character categories, and then using the resulting strings as reference to locate and identify corresponding parts of the displayed text. For example, the reference input string
"Dimensions are 1.4 in.×10.2 in.×14 in.", is parsed into a form string of
"[alpha(2)][space][number(2)][Separator(1)][number(1)] [alpha(2)][Separator(1)][space][number(2)] [Separator(1)] [number(1)] [alpha(2)][Separator(1)][space][number(2)] [Separator(1)][number(1)] [alpha(2)][Separator(1)][space]".
If a candidate string is analyzed and has a similar form string as the reference form string, the form string can be used to more accurately locate and compare corresponding values. For example, using the above reference string and reference form string, a candidate string
"Dim: 1.4 in.×10.2 in.×14 in.", is parsed into a form string of
"[alpha(2)][Separator(1)][space][number(2)][Separator(1)] [number(1)] [alpha(2)][Separator(1)][space] [number(2)] [Separator(1)][number(1)] [alpha(2)][Separator(1)][space] [number(2)][Separator(1)] [number(1)] [alpha(2)][Separator (1)][space]".
The analysis engine can use the form string to locate and identify the 3 dimension values in the strings based on the reference form string without requiring a predetermined regular expression.

The analysis engine creates a ranking of the various result sets of result elements based on a count of real-world data types in the result elements that constitute the result set along with information regarding their parent-child relationships, lineage, structure, style and data type characteristics as result sets (6) that the user may wish to filter (5).

The analysis engine also identifies potential candidate elements that link to additional pages containing additional result elements in the result set (7). If user interactions or executable components of the web page result in the web page being updated with identical or similar content by the web server (8), the tracking component receives notifications and further notifies the analysis/similarity engine to re-analyze the document.

Figure 2:
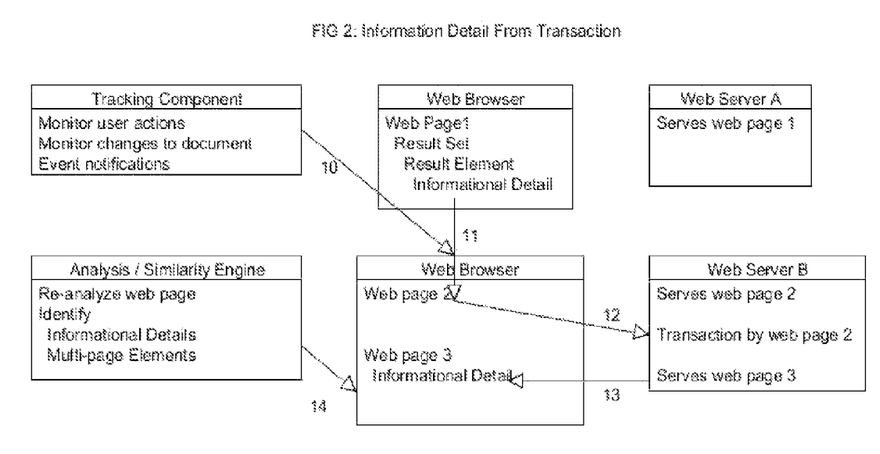
FIG. 2 illustrates the process diagram of the events and interactions when the user or program performs a transaction to gather additional informational details for a result element.

FIG. 2 illustrates the process of gathering informational details that are the result of a transaction on the same or different website. A transaction is an interaction with a web page by a user or program wherein the user or program uses or provides one or more informational details from a result element to the transaction web page and invokes the web page to process the information. A transaction can take the form of a mouse click on a link or a copy and paste operation of one of the informational details onto the transaction web page.

The tracking component captures all the necessary contextual information for gathering and locating the informational details used in transactions. When an informational detail of a result element in a result set is used as an input to a transaction on a different web page (11), the resulting web page (12, 13) is considered to contain additional informational details for the result element. The contextual details captured are the location, real-world data type contents, lineage, sibling sequence, structure and other information necessary to identify corresponding elements in other result elements in the result set. The tracking component captures (10) the context of the user's actions for subsequent gathering of informational details for the remaining elements in the result set.

The web page resulting from the transaction is analyzed (14) for informational details, and the resulting analysis can be used to validate corresponding informational details of other result elements. The analysis of this web page can also be used to set extended criteria on result elements, thus allowing the user to filter the result set based on informational details resulting from a transaction.

Extended criteria are logical, mathematical or boolean requirements placed on informational details. Logical and mathematical requirements applied to the results of other extended criteria are also considered extended criteria. For example, a requirement set on the price of a product to be less than $100 would constitute an extended criteria; another extended criteria would require that the product be less than 50 lbs; and a third extended criteria would accept a boolean OR condition between the first two extended criteria. Thus, result elements meeting either criteria would be part of the filtered result set.

Multi-page elements are also identified for cases where informational details span multiple pages.

Figure 3:
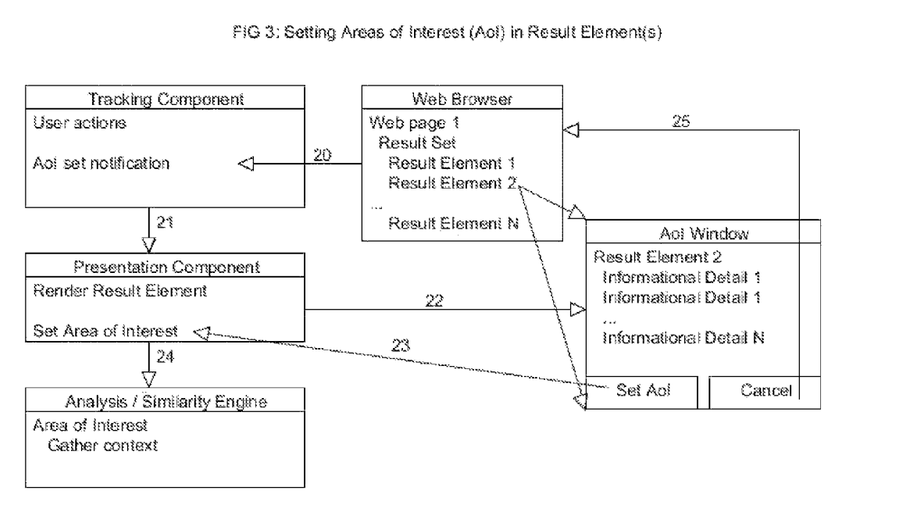
FIG. 3 illustrates the process diagram of the events and interactions when the user or program sets an Area of Interest picking informational details to be part of the Area of Interest (AoI).

FIG. 3 illustrates the process of setting an Area of Interest (AoI) in a result element. The tracking component detects a request by the user or program to set an AoI in a result element or in an informational detail resulting from a transaction. This request may be communicated using user-interface elements such as a menu or button or may be derived based on the user's actions. The AoI set notification (20) may be triggered by user interactions or via a programming interface. The tracking component passes the notification to the presentation component (21), which in turn presents the user with an AoI window (22), displaying the result element with all its informational details. If a program requests the AoI window, it is passed as a data structure to the program. The AoI window is used to select the informational details to be displayed in the filtered result set. The AoI request is ignored (25) if cancelled by the user or program. If a valid AoI is set, the returned result element contains informational details annotated appropriately (23). The returned result element is analyzed (24) by the analysis engine for information necessary for subsequent location of the corresponding informational details of interest for other result elements such as their lineage, siblings and real-world data types, etc.

Figure 4:
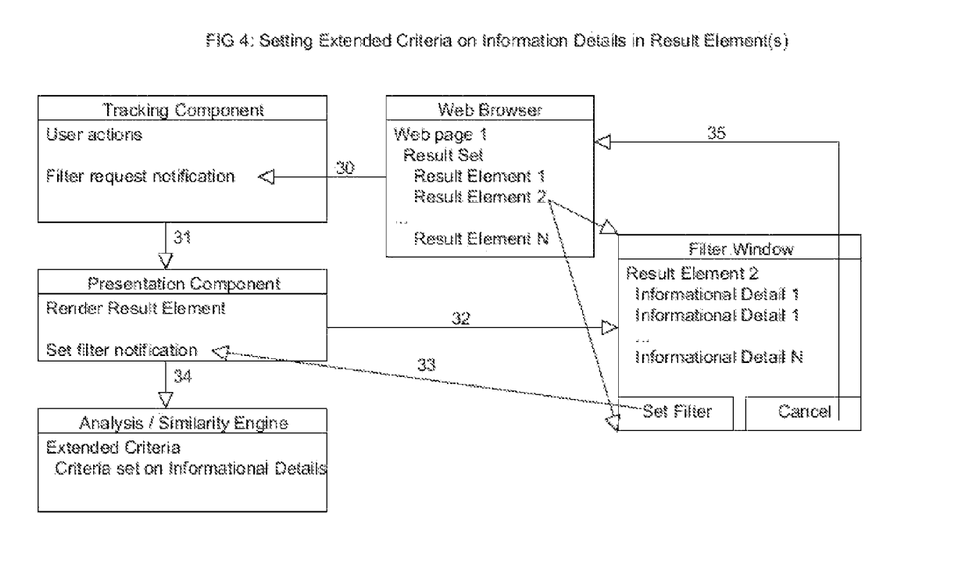
FIG. 4 illustrates the process diagram of the events and interactions when the user or program sets a filter on one or more informational details of a result element.

FIG. 4 illustrates the process of setting a filter on a result element. The tracking component detects a request by the user or program to set a Filter on a result element. The filter request notification (30) may be triggered by user actions on input devices or via a programming interface. The tracking component passes the filter request notification to the presentation component (31), which in turn presents the user with a filter window (32), displaying a result element with all its informational details. If a program requests the filter window, it is passed as a data structure to the program. The filter window is used to set the extended criteria, which are logical and/or arithmetic constraints set on informational details. The filter request is ignored (35) if cancelled by the user or program. If a valid result element is returned by the filter window (33), it is analyzed (34) by the analysis engine for the logical and arithmetic conditions of the extended criteria and information necessary for subsequent location of the corresponding informational details of other result elements, to which the extended criteria must be applied such as their lineage, siblings and real-world data types etc.

Figure 5:
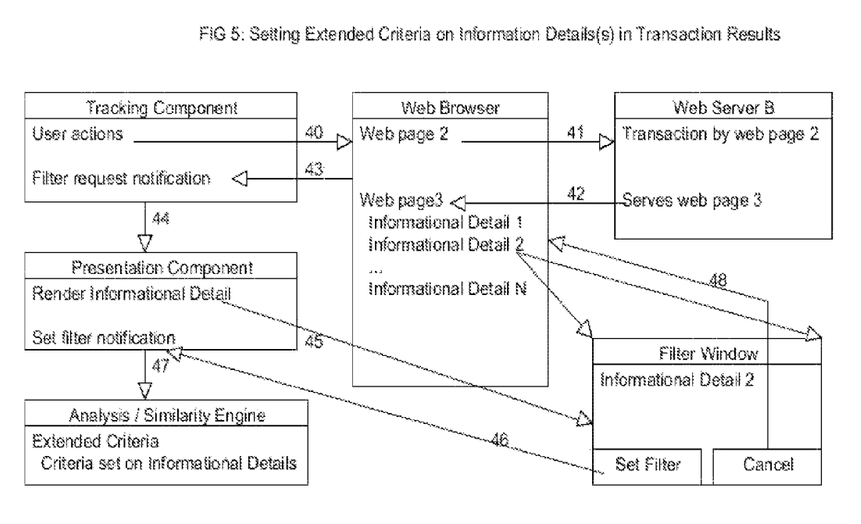
FIG. 5 illustrates the process diagram of the events and interactions when the user or program sets a filter on one or more informational details of a result element.

FIG. 5 illustrates the process of setting a filter on an informational detail on a web page that is the result of a transaction involving an informational detail from a result element. The tracking component detects a transaction by the user or program on a secondary website (40) (41) (42). The tracking component detects a request by the user or program to set an extended criteria on an informational detail on a web page (43). The filter request notification (43) may be triggered by user actions on input devices or via a programming interface. The tracking component passes the filter request notification to the presentation component (44), which in turn presents the user with a filter window (45) displaying the informational detail. If a program requests the filter window, it is passed as a data structure to the program. The filter window is used to set logical and/or arithmetic constraints on informational details. The filter request is ignored (48) if cancelled by the user or program. If a valid result element is returned by the filter window (46), it is analyzed (47) by the analysis engine for extended criteria.

Figure 6:
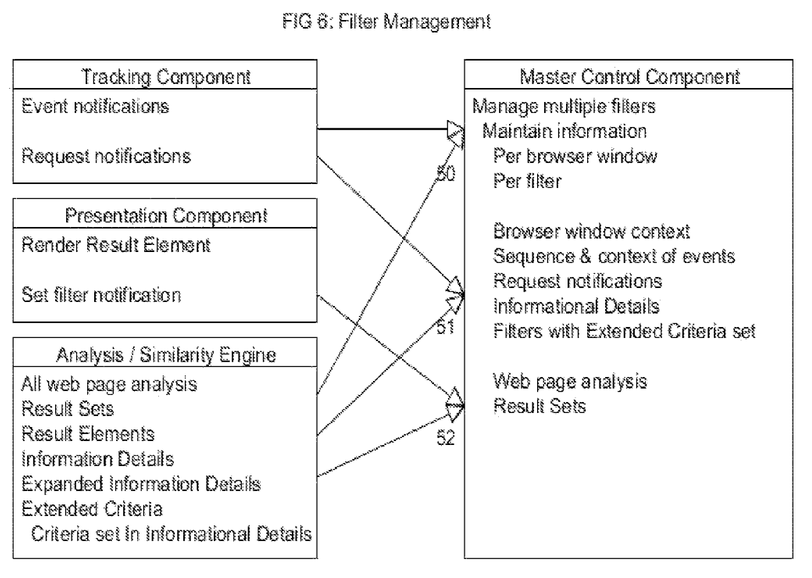
FIG. 6 illustrates the process diagram of the events and interactions between components of the invention to record and manage all the contextual information associated with one or more filters being set by a user or program.

FIG. 6 illustrates filter management by the master controller. All the components register all information gathered or generated with the master control component. The master control component in turns manages this information and records associations between the information from the various components. Notifications regarding browser and document events and analysis of web pages from the analysis/similarity engine are recorded and linked (50). Event notifications from the tracking component along with all the context information regarding use of informational details on the transaction web page to access the informational detail on a new web page are recorded and used to establish links from the result element to the web page of the informational detail accessed via the transaction(51). Set filter notifications from the presentation component and extended criteria from the analysis/similarity engine are linked together and connected to their source web pages reported by the tracking component (52).

Figure 7:
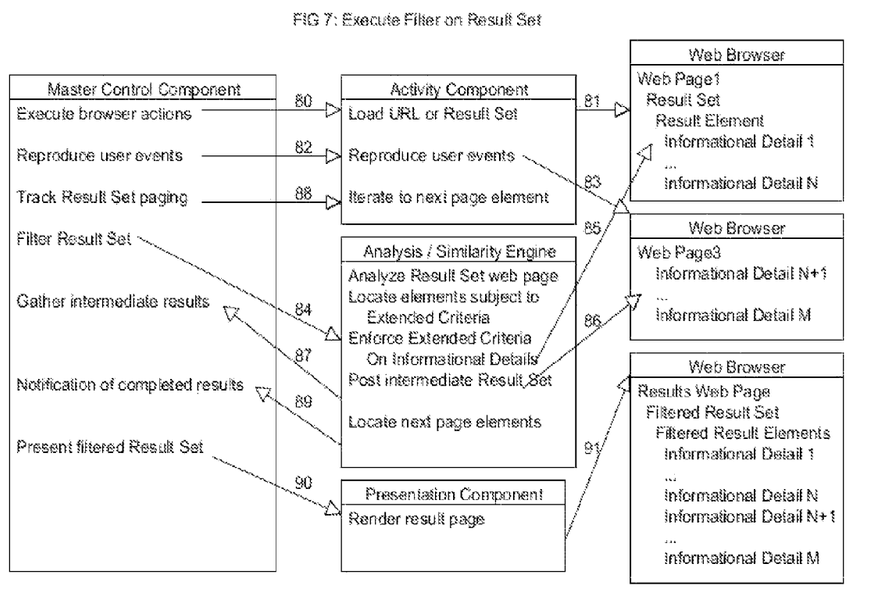
FIG. 7 illustrates the process diagram of the events and interactions when the user or program elects to execute a filter on a result set.

FIG. 7 illustrate the execution of a filter on a result set. The master control component manages the execution of the filter on a result set, by requesting the other components to take specific actions. The master control requests the activity component to load the web page from the URL of the result set (80), and the activity controller loads the URL (81). The master control component requests the activity component to reproduce user events (82), to load informational details (83). The master control component requests the analysis engine to analyze and filter (84) web pages 1 & 3, to identify specified result elements and informational details. Informational details must meet extended criteria (85) (86) to be included in the filtered result set. The filtered result set for the current page of a multi-page result set are collected in the master control component (87). The master control component requests the activity component to iterate to the next page of the results set (88). If no additional pages are identified by the analysis engine, then notification of completed results is sent by the analysis engine to the master control component (89). The master control component requests the presentation component to present the completed filtered result set (90), including all informational details of interest.

An embodiment of the invention implements and executes all the components on the client system. All the actions performed by the activity engine are initiated based on requests, definitions, and configuration parameters as provided by the master control component on the client system.

An embodiment of the invention implements functions of the invention that are computationally and/or network-traffic intensive, on a remote computing server acting as a proxy for the client and referred to as the LMS (Last Mile Search) Client Proxy Server. The activity engine, which is the component that generates all the web requests and network traffic, would be implemented on the LMS Client Proxy Server. Computationally-intensive functions such as the analysis/similarity engine and the master control component may also be implemented on the LMS Client Proxy Server.

In this embodiment, only the results of the parsing are returned to the user's computer system. A synchronized local master control component on the client system continues to maintain control and coordination of capture of user interaction, presentation of user-interface elements and user requests for filtering and expanding result sets. The benefit of a remote implementation of the activity engine and master control component parsing functions is the lowering of processing and bandwidth demands placed on the client computer system. This embodiment is especially suited for mobile and low power computing solutions.

Another benefit of implementing the activity engine and master control component parsing functions on a dedicated server is the option of using information gathered from many last mile searches and cross-site gather operations to improve the probability of success of the operations and deliver a better user experience based on greater bandwidth and compute capacity. For example a cross-site gather operation may require that the input text be uppercase. The centralized LMS Client Proxy Server, being aware of this, may reformat data for transactions to the site appropriately.

An embodiment of the invention could implement the modular components with well-defined interfaces like the one described or as a single program capable of presenting the various interfaces for the user or program of identical functionality. Such an implementation may be required in browser environments that may not provide modularity and separation necessary for a modular implementation.

Another embodiment of the invention may implement the functionality of the modules described above into a different subset of modules that perform one or more of the functions described, or as a single monolithic program, to provide the same benefits, functions and features. The primary determination of the type of the implementation may be determined by the browser for which this functionality is being provided.

An embodiment of the invention where user-interface actions such as, but not limited to, setting the criteria, selecting areas of interest and presenting the results, are performed within the context of the web page to allow the user to select and operate functionality of this invention and to present results of transactions outside the web page but within the frame and context of the web browser.

BACKGROUND OF THE INVENTION

Web browsers are software applications used to render information and perform transactions on websites on the internet. Internet Search Engines crawl websites collecting information and can assist users by reducing the search space down to a manageable number of websites. Websites in turn build interfaces to enable users to find relevant information hosted on the website, by providing varying degrees of search and/or filtering functionality.

Much of the information resulting from searches and filters on websites is published in the form of lists or tables. In this context a list or table is defined as any set of similar blocks of information directly published or dynamically produced from a larger set as the result of a search function on the website. To help the user customize the information presented, websites provide an interface to search and filter information on a limited number of details. The search functions on many websites do not enable filtering based on every possible detail or in every possible logical configuration. When the informational detail of interest to the user is not one of the details that can be filtered, the user must filter the results manually.

The logical rules applied by websites across the various details being filtered are not customizable by the user. Depending on the filter criteria this can result in too many or two few results, where the user must either manually filter the results or potentially miss viable results.

The details of an element in the list may also include a link to different websites for additional details or relevant information regarding the element, however the linkage is based on the convenience of the website and not the user of the website.

As an example, a website selling laptop computers may allow the user to reduce the list of all computers based on the price, manufacturer and other product details. Amongst the details of each computer may be a link to a (favorable) review of the computer. The user, however, may be interested in a computer within a particular price range as well as the manufacturer of the computer and the manufacturer of the graphics card. The user may also be interested in the review of computer on a different site.

A second example would be a website listing homes for sale. The search function on the website may allow the user to search for houses based on areas of the city, price and number of bedrooms. It may also provide a link to a mapping web service. However the user may wish to further filter the results based on age of the home and gather additional details such as neighborhood crime statistics from another web service.

In both the examples, the user must iterate over each result (result element) of the result set, reviewing the details and gather the additional information manually. In both of the examples, this invention would allow the user to define the custom filters as well as the additional sources to gather the external details using one element in the list as an example, and upon the users request perform the filter and gather operations for all of the other elements in the list. This invention, providing a client-side solution to add logical and functional capabilities beyond the options made available by the web page or website and gather other relevant information, helps reduce the search cost for the user.

BRIEF SUMMARY OF THE INVENTION & ITS BENEFITS

The present invention provides a process and method by which a user or program may reduce a number of entries in the list of results on a website based on arithmetic and logical criteria applied to any of the details associated with the elements in the list, yielding more relevant results.

The present invention provides a process and method by which transactions are performed on the same or different websites to gather additional details related to elements in the list on behalf of the user, saving the user iterative efforts.

The present invention provides a process and method for the user or program to select and present as part of the filtered results only those details that are of interest to the user or program and remove other details that are not.

A key aspect of this invention is to operate on and present lists and details spread across multiple web pages.

A key aspect of this invention is to identify lists on any web page using structure, style and real-world data types of content, that are part of the information blocks. The same process and method is applied toward the identification of elements used for performing transactions and filtering lists. This process and method is also used to identify details of interest to the user.

Another key aspect of this invention is that the stated functionality is independent of the structure or content of the websites being accessed and accomplished solely by analyzing the contents of the website and actions performed by the user.

This invention would also allow the user to save the criteria and additional details used to filter and expand the results on a given website for reuse on a subsequent visit, at another scheduled time or at regular intervals specified by the user or program.

What is claimed is:

1. A method enabling a user of an Internet browser to improve relevancy of search results or lists of information by collecting information from user-defined webpages and filtering the information based on user relevant content and said method being implemented entirely within the Internet browser and independently of any specific webpage, the method comprising:
    tracking interactions performed by the user wherein tracking interactions includes designating a first webpage as primary page and another webpage as a secondary page, recording the Uniform Resource Locator (URL) of the primary and secondary pages, and recording the type, style and content of one or more elements associated with the interactions, wherein the interactions include:
    copying, pasting, typing, selecting or clicking the one or more elements on the primary page;
    copying, pasting, typing, selecting or clicking the one or more elements on secondary page; and
    setting one or more relevant content on the primary or the secondary page, wherein the relevant content is an area of interest or a filter;
    recording the type, style and content of the one or more elements relevant to the interaction;
    saving a recipe wherein the recipe includes the interactions performed on the primary and the secondary pages;
    displaying a repeat recipe interface option that when executed automatically repeats the recipe on one or more primary pages and one or more secondary pages;
    and displaying an access results interface option that when executed accesses results of the automatically repeated one or more recipes, wherein the results include one or more indicators which indicate whether the one or more elements on the primary page perfectly met, partially met and did not meet the user relevant contents.

2. The method of claim 1, further comprises:
    setting the filter, wherein the filter includes:
    a mathematical condition, logical conditions or Boolean condition.

3. The method of claim 1, further comprising:
    the tracking interactions including recording real-world data type of the one or more elements associated with the interactions; and
    the repeat recipe interface option identifying the real-world data type of the one and one or more elements on the one or more primary or secondary pages, and repeating the recipe based on the association of the real-world data types of the one or more elements associated with the interaction and the one or more elements of the primary or the secondary pages.

4. The method of claim 1, wherein the repeat recipe interface option further comprises:
    identifying the one or more elements on which the recipe is performed; and
    identifying whether a new version of the primary page and determining whether the identified one or more elements correspond to the one or more elements on the new version of the primary page.

5. The method of claim 1, further comprises:
    setting the filter; and
    wherein the repeat recipe interface option further comprises scheduling an execution time to automatically repeat the recipe.

6. The method of claim 1, further comprising:
    the user setting the filter;
    and the repeat recipe interface option further comprises:
    selecting textual content on the one or more primary pages or the one or more secondary pages.

7. The method of claim 1, further comprising:
    opening a third web page which matches the primary page;
    opening a fourth web page which matches the one or more secondary page
    and displaying for the repeat recipe interface option including automatically identifying the third web page as the primary page and the fourth web page as the secondary page.

* * * * *